Nov. 23, 1926. 1,607,946

W. C. S. CROSSKEY

SINGLE FINGERPRINT IDENTIFICATION SYSTEM

Filed August 17, 1921  4 Sheets-Sheet 1

INVENTOR,
Walter C. S. Crosskey,
by
J. Hanson Boyden.
ATTORNEY.

Nov. 23, 1926.  
W. C. S. CROSSKEY  
1,607,946  
SINGLE FINGERPRINT IDENTIFICATION SYSTEM  
Filed August 17, 1921    4 Sheets-Sheet 2
Fig. 2.      Fig. 3.      Fig. 4.
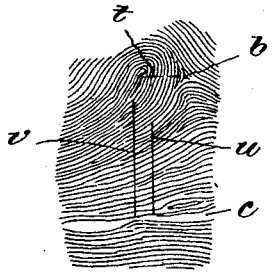 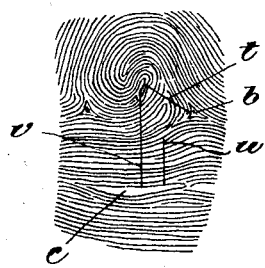 
Fig. 6.
Inventor  
Walter C. S. Crosskey,  
By J. Hanson Boyden,  
Attorney.

Nov. 23, 1926.                                                    1,607,946
                      W. C. S. CROSSKEY
              SINGLE FINGERPRINT IDENTIFICATION SYSTEM
                  Filed August 17, 1921      4 Sheets-Sheet 3

INVENTOR.
Walter C. S. Crosskey,
BY
J. Hanson Boyden,
ATTORNEY.

Nov. 23, 1926.

W. C. S. CROSSKEY 1,607,946

SINGLE FINGERPRINT IDENTIFICATION SYSTEM

Filed August 17, 1921    4 Sheets-Sheet 4

Inventor
Walter C. S. Crosskey,
By J. Hanson Boyden,
Attorney.

Patented Nov. 23, 1926.

1,607,946

UNITED STATES PATENT OFFICE.

WALTER C. S. CROSSKEY, OF SAN QUENTIN, CALIFORNIA.

SINGLE FINGERPRINT IDENTIFICATION SYSTEM.

Application filed August 17, 1921. Serial No. 493,040.

My invention relates to methods of identifying individuals by means of their finger prints, and to indexing and filing systems adapted for the carrying out of such methods.

Identification of individuals by means of finger prints has long been known, but so far as I am aware, the only method of identification heretofore commonly practiced has been based upon a classification of the prints of all ten fingers. Perhaps the most widely used means of carrying out this method comprises what is known as the Henry system of finger print classification, the prints of all ten fingers of an individual being charted on a special card or record, and being given a classification formula, which is written on the record. These records are then filed away in groups according to the classification formula, so that, if the complete classification is known, any particular record can be readily located.

A brief and concise exposition of the Henry system of finger print classification and identification is found in Parliman Patent No. 1,206,362, dated Nov. 28, 1916, which patent also discloses a filing and indexing system designed to facilitate the finding of any particular record, and to enable the search to be somewhat narrowed down, if the complete classification formula is not entirely known.

As distinguished from the above mentioned ten finger method, the object of the present invention is to devise a system whereby the print of one single finger alone will be sufficient to identify an individual. This is especially desirable in connection with the identification of criminals, who, as is well known, often leave the print of one or more fingers impressed upon some article at the scene of the crime, but who rarely leave an impression of a sufficient number of fingers to enable the complete ten-finger classification formula to be worked out. The invention will also be of value in various fields of industry and commerce, since it seeks to provide, by means of a single finger print, a certain medium of identification at a distance.

My invention is not designed to replace or supplant the ten-finger systems now in use, but is intended as an auxiliary, to be used in connection with the old system to supplement the same and improve the effectiveness thereof.

To the above and other ends, my invention resides in a novel method of classifying single finger prints, and in an improved system of indexing, filing, and identifying such prints, all as hereinafter described and claimed, and shown, by way of illustration, in the accompanying drawings, forming part of this specification, and in which:—

Figs. 2, 3 and 4 are enlarged fragmentary reproductions of three different types of finger print patterns, illustrating my new method of classification;

Fig. 6 is a view of one of my improved key cards used in connection with the identification charts.

In order that a clear understanding of my improved single finger print system, and its relation to existing systems, may be had, I shall first briefly outline the ten-finger system as carried out by means of the Henry classification, above referred to.

Figure 1:
Fig. 1 is a view of a finger print record commonly used in connection with the well known ten-finger classification, my new classification also appearing thereon.

As shown in Fig. 1, the finger print record of an individual is usually placed upon a card 5, divided into two horizontal rows of block spaces A, B, C, D, E, and F, G, H, I, J, respectively. In the first row are recorded the separate impressions of the thumb and fingers of the right hand with the thumb at the left and the little finger at the right, while in the second row are similarly recorded the separate impressions of the left hand with the records of corresponding fingers or digits of the two hands below each other. At the bottom of the card may be arranged the joint impressions of the fingers of both the left and the right hand as shown at K and L. The classification itself, that is, the expression in numbers and letters that represent a reading of the full record, is expressed in a formula as indicated at M at the upper right hand corner of the card.

The process by which this formula is derived will not be gone into here, as it has no bearing on the present invention, and is well known to those skilled in the art.

Finger print patterns are, of course, of many different kinds, but the principal recognized types of patterns are loops, whorls, twinned loops, lateral pockets, central pockets, arches, tented arches, composites, and accidentals. Each type has its related modifications that are appropriately named, and classified with them through these modifications into subordinate groups, or sub-classes. These are useful in narrowing down the certainty of identification. Thus, Fig. 2 is a left slope loop, Fig. 3 is a composite; and Fig. 4 is a whorl. Right slope loops are indicated by the letter U, left slope loops by the letter R, whorls are indicated by the letter W, and the remainder of the patterns are indicated by the capitalized first letter of their type or name.

According to my improved classification, single finger print patterns are first divided into major groups and are indicated by the letter of their type, each group in turn being subdivided into subordinate groups according to the individual attributes of the pattern. Thus, F, Fig. 1, is a left slope loop with a natural recurve at core of pattern which is class lettered "R"; Fig. 2 has a single rod under the recurving loop thereby segregating this pattern into subgroup "R, 1."; if a core contains two rods, it is sub-group "R, 2"; if a core consists of several rods, it is sub-group "R, x."; if the ridges at core are irregular in formation, it is "R, z."; if a double bifurcation of ridges appear at the core so as to form an island, it is "R, i."; and if an R impression is marred by a scar as at E (Fig. 1) it is "R, s.". Other segregations can be made from a foundation supplied by the individual attributes of each pattern if necessary; and similar modifications segregate the "U" pattern into corresponding subordinate groups. "W" indicates the major unit of whorls, also denoting the first subordinate group consisting of whorls with a systematic formation of complete circles, as in Fig. 4; while D and I (Fig. 1) are single spiral types and therefore divided into sub-group W, 1; B (Fig. 1) is a double spiral type, giving rise to minor group W, 2.; W, e. is elliptical, somewhat more so than D (Fig. 1); W, L. is a very large whorl type and W, s. forms the subordinate group caring for the scarred patterns; TL forms a major group, or type; see H, (Fig. 1), and TL,s. a sub group for scarred twinned loops; G (Fig. 1) is major group LP, and LP, s. designates a minor unit; CP forms a major group and CP,o. and CP,s. the minor groups or sub-classes; C indicates a major group, with C,s., as a minor unit of composites; A indicates a major group with A,i., and A,s., as the sub-groups; T indicates a major group with T,s., as a minor unit; while Ac denotes a major group with Ac,s., the last sub-division. Other segregations can be made, but it is not expedient to give them all here as too much space would be required.

The majority of patterns possess at least two definite attributes named core, or inner terminus, and delta, or outer terminus. Fig. 4 at a has a short rod that is the inner terminus; b designates two deltas or outer termini; Fig. 2, however, has only one delta. The line of flexure is indicated at c.

To make a scientific classification of a pattern, according to my new method, the type is first ascertained by inspection, and its symbol placed upon a card, as hereinafter described. The individual characteristics of the pattern are then determined, as follows. A line is first drawn from the core to the delta, as, for example, the line t in Figs. 2, 3, and 4. The number of ridges that this line crosses or touches is counted, and this constitutes the first count. A line is then drawn from the delta line to the line of flexure of phalanx, as indicated at u in Figs. 2, 3, and 4. The number of ridges which this line touches is counted and this constitutes the second count. Finally, a line is drawn from the core to the line of flexure, as indicated at v, Figs. 2, 3, and 4, and the number of ridges which this line touches are counted, this constituting the third and last count. The line, above referred to, may of course be either real or imaginary, and is only for the purpose of designating the courses to be followed in traversing the print from one basic point or attribute to another.

The reading of a pattern, if stated orally, or written for telegraphic or other uses would be indicated by first giving the symbol denoting the group and sub-group, and following this by the numbers resulting from the first, second and third counts, in order. Thus a pattern similar to that shown in Fig. 2, or at F, Fig. 1, might be designated by a reading such as R./9/12/19, and a pattern similar to that shown in Fig. 4, or at D, Fig. 1, by some such reading as W,1./16/8/24. This latter reading, for example, means that the pattern is of the whorl type, with a single core, and that there are 16 ridges between such core and the delta, 8 ridges between the delta and line of flexure, and 24 ridges between the core and line of flexure. Obviously, the chance of two individuals having a finger possessed of this same exact combination of attributes is very remote, and hence the determination and recording of such attributes forms a ready and positive means of identification.

In order to render my improved identification system of practical value, means must be provided whereby the complete data relating to an individual may be ascertained from a knowledge of the attributes of a single finger print. To this end, I have devised a series of identification charts and key cards, through the medium of which the complete ten-finger record of any individual may be located from a knowledge of the attributes of any one finger.

Figure 5:
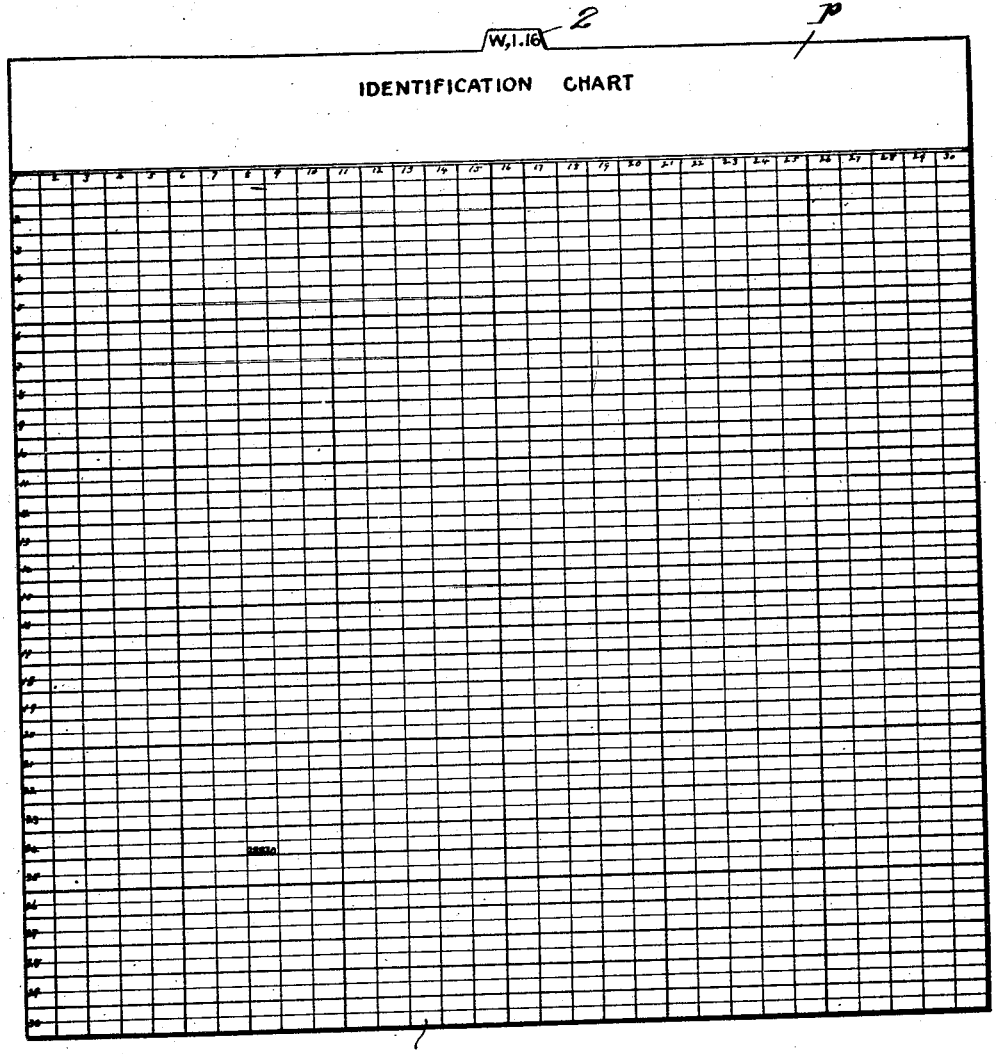
Fig. 5 is a view of one of my improved identification charts hereinafter described.

The improved identification chart 1 is shown in Fig. 5. It consists of a thin sheet of card board or the like, ruled so as to provide a plurality of intersecting vertical columns and horizontal rows or zones. Preferably thirty columns and thirty zones are provided, and these are sufficient to care for any finger pattern which may be encountered. These columns and zones are preferably numbered consecutively as shown in Fig. 5 and the horizontal zones may be divided into two equal areas by means of relatively light or different colored lines as indicated. This is to provide for the possibility of the occurrence of two finger prints having the same attributes.

Figure 7:
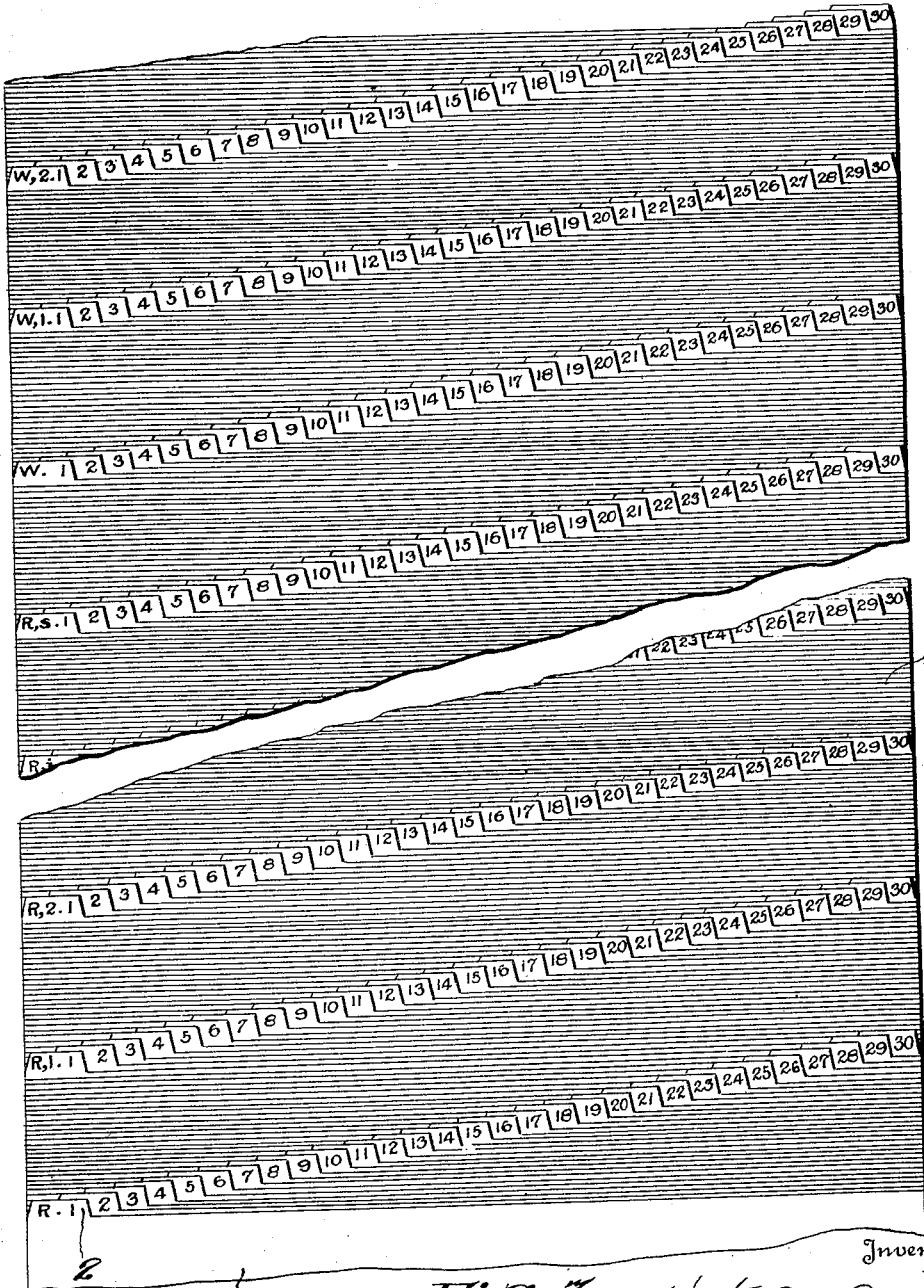
Fig. 7 is a fragmentary plan view illustrating a filing system which may advantageously be employed in connection with my improved identification charts.

At the top of the identification charts is printed the symbol designating type and group and a number indicating the first count of a finger print pattern, in accordance with my improved system. These symbols and members are perfectly located on a projecting tab carried at the upper edge of the chart, as indicated at 2 in Fig. 5, these tabs being preferably arranged at different points in the width of the card, so that the numbers on the various tabs will be visible when the charts are assembled in a vertical filing system, as illustrated in Figure 7.

It will be understood that since it is possible for the first count to consist of a number ranging from 1 to 30, I propose to provide a series of 30 charts for each sub-group or type. Thus there will be 30 charts each bearing the symbol R and numbered 1 to 30; 30 charts each bearing the symbol U and numbered 1 to 30. Also, the following charts:—

| | | | |
|---|---|---|---|
| R,1. | 1 to 30 | U,1. | 1 to 30 |
| R,2. | 1 to 30 | U,2. | 1 to 30 |
| R,$x$. | 1 to 30 | U,$x$. | 1 to 30 |
| R,$z$. | 1 to 30 | U,$z$. | 1 to 30 |
| R,$i$. | 1 to 30 | U,$i$. | 1 to 30 |
| R,$s$. | 1 to 30 | U,$s$. | 1 to 30 |
| W. | 1 to 30 | CP. | 1 to 30 |
| W,1. | 1 to 30 | CP,$o$. | 1 to 30 |
| W,2. | 1 to 30 | CP,$s$. | 1 to 30 |
| W,$e$. | 1 to 30 | A. | 1 to 30 |
| W,L. | 1 to 30 | A,$i$. | 1 to 30 |
| W,$s$. | 1 to 30 | A,$s$. | 1 to 30 |
| TL. | 1 to 30 | T. | 1 to 30 |
| TL,$s$. | 1 to 30 | T,$s$. | 1 to 30 |
| LP. | 1 to 30 | A$c$. | 1 to 30 |
| LP,$s$. | 1 to 30 | A$c$,$s$. | 1 to 30 |
| C. | 1 to 30 | C,$s$. | 1 to 30 |

Obviously on every chart there will be room for data indicating nine hundred different individual single finger patterns, or counting the double zones, there will be room for eighteen hundred. The complete set of identification charts will comprise the above 36 groups of 30 charts each, thus making over a thousand separate charts. These charts will be arranged in one or more suitable drawers in a vertical filing system, as shown in Fig. 7, with the tabs 2 bearing the symbols and numbers so arranged that the numbers at least will be visible at a glance. The symbol on the first chart of each group will, of course, designate the type or class. Since it would be impossible within the limited space on these identification charts, to write the full data of any given finger print, I have conceived the idea of using key numbers by which the individual patterns may be identified. An illustration will make this clear. Take, for example, the finger print pattern above referred to, as shown in Fig. 4, the reading of which we have assumed to be W,1./16/8/24. This particular print will be listed on identification chart W,1./16 and at the intersection of the eighth vertical column, corresponding to the second count, and the 24th horizontal zone, corresponding to the third count, will be placed a key number by which the particular print in question can be identified. As shown in Fig. 5, the key number corresponding to the pattern W,1./16/8/24 has been illustrated as number 28830. Obviously, each chart may contain a plurality of key numbers, each corresponding to an individual finger print, all of such prints, however, being of the type indicated by the symbol such as W,1. and all having the same first count, such as 16, the distinguishing characteristics of the several prints being indicated by the position of the key number on the chart, such position, as above explained, serving to designate the second and third counts.

In practice, I find it desirable to place the indicia corresponding to my improved single finger print readings upon the complete ten-finger print record now in use, as shown in Fig. 1. By reference to this figure, it will be seen that at F is shown a finger print pattern having the reading R,9./12/19, while at D is shown a finger print pattern having the reading W,1./16/8/24, heretofore discussed. A similar reading is shown at I. In placing this data upon the finger print record, I have adopted the system of writing the symbol in the upper left hand corner of the space containing the finger print pattern, the first count in the upper right hand corner, the second count in the lower left hand corner, and the third count in the lower right hand corner, all as shown in Fig. 1. Since the record shown in Fig. 1 contains the single finger pattern W,1./16/8/24, designated on the identification chart of Fig. 5 by key number 28830, I place this number at the top of the ten-finger record, as indicated at N in Fig. 1. If these ten-finger records were filed numerically, it would be a simple matter to locate the record corresponding to any given key number. However, the method universally employed at present is to file these records by classes and sub-classes, in accordance with the old ten-finger classification formula, as shown at M. The patent to Parliman, above referred to, shows one method in which these records are arranged and filed.

Since, therefore, it is desirable that my improved single finger print system be adaptable for use in connection with existing ten-finger systems, without in any way changing the method of filing the latter, it is necessary to devise some means by which a complete record, as shown in Fig. 1, may be located from a knowledge of its key number.

To accomplish this, I provide a set of intermediate cards forming the connecting link between the identification charts and the complete records. These intermediate cards I have designated "key cards," and a typical card of this character is shown in Fig. 6. The card is designated by the reference numeral 3 and preferably is provided with a tab 4 projecting from its upper edge, on which tab I place a key number as hereafter described. The card is provided along its left hand margin with a column adapted to contain a plurality of key numbers. As shown, space is provided for ten key numbers, as, for example, number 28830 to 28839 inclusive. Therefore, I place on the tab 4 the first of this series of numbers, namely 28830. The next card of the series would carry numbers 28840 to 28849, and its tab would bear the number 28840, and so on throughout the series.

In addition to the key numbers, each card has a column O in which data concerning the individual to be identified is written, this data preferably including name, age, nationality and occupation.

At the right hand side the key cards are provided with cross ruled columns P, adapted to receive indicia corresponding to the individual readings of all ten fingers. Between the columns O and P is a column adapted to receive indicia according to the old ten-finger classification formula, as shown at M.

It will be noted that in the column P, there is provided for each key number ten spaces, one for each finger, each space being divided into four squares or areas. The symbols and numbers corresponding to the individual finger print readings are arranged in these four squares within each of the ten spaces in the same order as shown in the spaces A, B, C, etc. in Fig. 1. That is to say, the symbol and number corresponding to the first count are written in the two upper squares of the space, while the numbers corresponding to the second and third count are written in the two lower squares. By virtue of this arrangement, the readings on the key cards can be identified at a glance, with the corresponding finger prints on the complete record, shown in Fig. 1.

It will be understood that as many key cards are employed as are necessary to take care of all of the key numbers appearing on the identification charts, and that these key cards are arranged in suitable drawers according to a vertical filing system, in a well known manner.

The method of using my improved system, in connection with existing systems, will therefore be apparent. When it is desired to identify an individual by means of a single finger print, the finger print is first examined to determine its type or class, and then its characteristic attributes determined by means of counts on the three given courses, as shown in Figs. 2, 3 and 4. The formula thus derived is written down in the manner above described, and reference is then made to the identification charts shown in Fig. 7, and the chart having the symbol and first count in question is then withdrawn from the file. Assuming that the symbol and first count are indicated by W, 1./16, and that the second and third counts are 8 and 24 respectively, the card shown in Fig. 5 is withdrawn and by reference to the eight vertical column and twenty-fourth horizontal zone, the key number 28830 is found. Turning then to the key card file, the card bearing the key number 28830 is withdrawn, and corresponding to this number on the card is found the full data relating to the individual in question and also the complete ten-finger classification. By inspection of this card, it is also determined that the finger print in question corresponds to that of the third or ring finger of the individual. Then, by means of the old classification formula given on this key card, the complete ten-finger record, as shown in Fig. 1 can be readily located, by means of known filing systems such as that disclosed in the Parliman patent.

Thus, it is possible to completely identify an individual by means of an impression from one single finger only, and it is thought that the many advantages of my improved system will be fully appreciated by those skilled in the art, without further discussion.

What I claim is:—

1. A finger print identification system comprising a series of charts each of which bears data indicating the individual characteristics of one or more single finger prints, such data including an appropriate symbol designating the type to which the print belongs, and one or more numerals indicating the number of ridges encountered in traversing a course between definite attributes of the print, each of said charts also bearing a key number corresponding to every individual finger print so indicated.

2. A finger print identification system comprising a series of charts each of which bears at its upper edge data indicating the type and group to which a single finger print belongs, and each of which also bears other data indicating the specific distinguishing features characteristic of any individual finger prints which can be classified under the type and group given.

3. A finger print identification system comprising a series of charts each of which bears at its upper edge data indicating the type and group to which a single finger print belongs, all of said charts being similarly ruled to provide intersecting vertical and horizontal columns and zones, arranged to constitute means for distinguishing individual finger prints of the group from each other, the intersections of the columns and zones affording spaces in which key numbers for identifying the corresponding individual finger prints may be written.

4. A finger print identification system comprising, in combination, a set of identification charts each bearing the classification of an individual finger print, a set of key cards, each bearing a series of key numbers and the corresponding individual classifications of all ten fingers, as well as the usual ten finger classification, and a set of complete finger print records on each of which appear the usual prints and data.

5. A finger print identification system comprising, in combination, a set of identification charts and a set of key cards, all said charts and cards bearing key numbers, by means of which corresponding elements of each set may be determined.

6. A finger print identification system comprising, in combination a set of identification charts, a set of key cards, and a set of complete finger print records, all bearing key numbers by means of which corresponding elements of each set may be determined.

7. A finger print identification system comprising, in combination, a set of single finger identification charts, a set of complete ten-finger print records, and means by which the complete ten-finger print record corresponding to any given single finger identification chart can be determined and located from an inspection of such chart.

8. A finger print identification system comprising a plurality of sets of single finger identification charts, the charts of each set all bearing the same symbol, indicating the common characteristic of all individual finger prints of a certain class. the symbol for different sets being different, and each chart bearing, in addition to such symbol, a number indicating a feature common to all finger prints of a certain sub-class under the main class indicated by the symbol, the charts of each set being arranged in numerical sequence.

9. A finger print identification system comprising a plurality of sets of single finger identification charts, the charts of each set all bearing the same symbol, indicating the common characteristic of all individual finger prints of a certain class, the symbol for different sets being different, and each chart bearing, in addition to such symbol, a number indicating a feature common to all finger prints of a certain sub-class under the main class indicated by the symbol, each chart further having means by which the features which distinguish one individual finger print from others of the same sub-class may be indicated, such means being associated with a special key number by which the individual print may be identified.

10. A finger print identification system comprising, in combination, a set of identification charts each of which bears data indicating the individual characteristics of a single finger print, and a key number assigned to the particular finger print so indicated, and a set of key cards, each bearing data indicating the characteristics of one or more finger prints of a person to be identified, together with a description of such person, each of said cards also bearing a key number, the key numbers for a chart and a card bearing related finger print data being the same, whereby the card corresponding with the key number appearing on any given chart may be readily located.

11. A finger print identification system comprising a plurality of sets of single finger identification cards arranged in a vertical file, each set being designated by a distinguishing symbol indicating the common characteristic of all individual finger prints of a certain class, the symbol for different sets being different, and each card bearing a numeral indicating a feature common to all finger prints of a certain subclass under the main class indicated by the symbol, the cards of each set being arranged in numerical sequence, and being provided with tabs projecting from their upper edges, on which tabs the said numerals are displayed.

12. In a system of classifying prints, a finger print having a straight line associated therewith connecting two basic points or attributes thereon, whereby an identifying rating is obtained by counting the ridges of the finger print crossed by said line between said points.

13. A finger print identification system comprising a plurality of sets of single finger identification cards, each set being designated by a distinguishing symbol indicating the common characteristic of all individual finger prints of a certain class, the symbol for different sets being different and each card bearing a numeral indicating a feature common to all finger prints of a certain subclass under the main class indicated by the symbol, the cards of each set being arranged in numerical sequence.

WALTER C. S. CROSSKEY.